(12) United States Patent
Rahman

(10) Patent No.: US 9,549,362 B2
(45) Date of Patent: *Jan. 17, 2017

(54) RADIO NETWORK CONTROLLER WITH IP MAPPING TABLE

(71) Applicant: AT&T INTELLECTUAL PROPERTY I, LP, Atlanta, GA (US)

(72) Inventor: Moshiur Rahman, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/845,336

(22) Filed: Sep. 4, 2015

(65) Prior Publication Data

US 2015/0382276 A1    Dec. 31, 2015

Related U.S. Application Data

(63) Continuation of application No. 14/487,444, filed on Sep. 16, 2014, now Pat. No. 9,154,420, which is a continuation of application No. 13/795,317, filed on Mar. 12, 2013, now Pat. No. 8,867,492, which is a continuation of application No. 12/839,219, filed on Jul. 19, 2010, now Pat. No. 8,406,195.

(51) Int. Cl.
| | |
|---|---|
| *H04W 4/00* | (2009.01) |
| *H04W 40/20* | (2009.01) |
| *H04W 40/36* | (2009.01) |
| *H04L 12/741* | (2013.01) |
| *H04W 40/02* | (2009.01) |
| *H04W 40/24* | (2009.01) |
| *H04W 76/02* | (2009.01) |

(52) U.S. Cl.
CPC ............ *H04W 40/20* (2013.01); *H04L 45/745* (2013.01); *H04W 40/02* (2013.01); *H04W 40/36* (2013.01); *H04W 40/246* (2013.01); *H04W 76/022* (2013.01)

(58) Field of Classification Search
CPC ...... H04W 40/20; H04W 40/02; H04W 40/36; H04W 40/246; H04W 76/022; H04L 45/745

See application file for complete search history.

(56) References Cited

U.S. PATENT DOCUMENTS

| | | | |
|---|---|---|---|
| 6,766,168 B1 * | 7/2004 | Lim | ................... H04W 76/041 360/328 |
| 7,120,460 B2 | 10/2006 | Shaheen | |
| 7,302,497 B2 | 11/2007 | Vilander | |
| 7,391,754 B2 | 6/2008 | Bae | |
| 7,505,431 B2 | 3/2009 | Chitrapu | |

(Continued)

*Primary Examiner* — Clemence Han
(74) *Attorney, Agent, or Firm* — Guntin & Gust, PLC; Joseph Hrutka

(57) ABSTRACT

Devices, systems, and methods are disclosed for routing data to mobile devices that undergo handovers from one access point to another. In one embodiment, a processor performs operations including obtaining a network location of a mobile device, updating a mapping table with the network location of the mobile device, obtaining a request to transfer a data packet to the mobile device, routing the data packet to the mobile device according to the mapping table, and forwarding the network location to a source of the data packet. Additional embodiments are disclosed.

19 Claims, 8 Drawing Sheets

(56) References Cited

U.S. PATENT DOCUMENTS

| | | | |
|---|---|---|---|
| 2002/0031107 A1* | 3/2002 | Li | H04L 61/2015 |
| | | | 370/338 |
| 2002/0095662 A1 | 7/2002 | Ashlock | |
| 2004/0076179 A1 | 4/2004 | Kaminski | |
| 2004/0097232 A1 | 5/2004 | Haverinen | |
| 2004/0174816 A1 | 9/2004 | Stewart | |
| 2005/0210154 A1 | 9/2005 | Verma | |
| 2005/0239461 A1 | 10/2005 | Verma | |
| 2006/0128362 A1 | 6/2006 | Bae | |
| 2006/0215623 A1* | 9/2006 | Lin | H04L 29/12018 |
| | | | 370/338 |
| 2010/0014507 A1 | 1/2010 | Linkola | |
| 2010/0077102 A1 | 3/2010 | Lim | |
| 2011/0310824 A1* | 12/2011 | Perras | H04W 76/022 |
| | | | 370/329 |

* cited by examiner

RADIO NETWORK CONTROLLER WITH IP MAPPING TABLE

CROSS-REFERENCE TO RELATED APPLICATIONS

This application is a continuation of U.S. patent application Ser. No. 14/487,444, filed Sep. 16, 2014, which is a continuation of U.S. patent application Ser. No. 13/795,317, filed Mar. 12, 2013 (now U.S. Pat. No. 8,867,492), which is a continuation of U.S. patent application Ser. No. 12/839,219, filed Jul. 19, 2010 (now U.S. Pat. No. 8,406,195), the disclosures of which are all incorporated herein by reference in their entirety.

FIELD OF THE DISCLOSURE

The present invention relates to mobile networks. In particular, the present invention relates to providing Internet Protocol (IP) mobility routing capabilities on a radio network controller (RNC).

BACKGROUND OF THE DISCLOSURE

In modern cellular networks, Internet Protocol (IP) addressing is being used more extensively than ever before. Mobile devices are equipped with not only cellular transceivers but also data MODEMs such as General Packet Radio Service (GPRS) transceivers, Wi-Fi transceivers, etc. Further, additional network elements such as those that are part of an IP Multimedia System (IMS) use IP addressing to transmit data packets across network elements.

However, these network elements are not being used to the fullest potential. A UMTS Terrestrial Radio Access Network (UTRAN) includes, inter alia, a plurality of access points such as Node Bs (equivalent to GSM Base Transceiver Stations) that are controlled by a controller such as a Radio Network Controller (RNC). The RNC interfaces with other network elements such as a Mobile Switching Center (MSC), and gateways enabling communication with IP networks, such as G-GSN and S-GSN. The problem arises when a mobile device moves from one area serviced by one access point/Node B to another area served by another access point. A seamless handover from one radio to another requires an uninterrupted flow of data to and from the mobile device. Today, seamless handovers require tremendous network resources, and under heavy use, data packets can be lost and connections dropped because existing RNCs are not equipped to re-route data packets as they are performing handovers. Although MSCs perform handover duties, MSCs are not directly involved with base stations/Node Bs, and the precise updated network location of the mobile device is not known to all the intermediary elements. Consequently, data from a source network element is routed across several additional elements before it ever reaches the mobile device.

The problem is compounded by the addition of access points in the form of Wireless Local Area Network (WLAN) hotspots. Since modern mobile devices are able to communicate with different types of networks, additional processing is required to bring awareness of the new location to the network elements routing the data. At present, there is no efficient method for the core network elements to be made aware of the location of the mobile device such that data is transferred effectively to the mobile device via the new access point.

Therefore, what is needed is a device, system, or method to seamlessly route data packets to mobile devices that traverse multiple access points.

The present invention solves the above problems by enabling a controller, such as a RNC or BSC, to map the locations of mobile devices that are connected to various access points on one or more networks. The access points include base stations, Node Bs, wireless LAN, etc., and incorporate or are coupled to network agents. The network agent reports the location of the mobile device to the controller via a plurality of means such as over an IP network, a powerline network, or a satellite network. Using the database, or IP mapping table, having the most current locations of all the mobile devices under its domain or area, the controller can route data packets to the mobile devices using the most effective routing paths.

In one exemplary embodiment, the present invention is a controller for routing a data packet to a mobile device on a network, including a processor, a memory in communication with the processor, the memory including a database containing an Internet Protocol (IP) address associated with a corresponding mobile device, a transceiver in communication with the processor, and routing logic on the memory for receiving a network location from a network agent in communication with the mobile device, updating the database with the network location, and routing a data packet to the mobile device via the network location. The controller may be a radio network controller (RNC) or a Base Station Controller (BSC). The network agent is coupled to an access point enabling the mobile device to access the network. The access point is any one of a Wireless Local Area Network (WLAN) router and a Node B. The controller further performs handovers between the WLAN router and the Node B, or between several WLAN routers or Node Bs. The network agent transmits the network location to the controller via a powerline or satellite network.

In another exemplary embodiment, the present invention is a system for routing a data packet to a mobile device on a network, including a radio network controller, a plurality of access points in communication with the radio network controller, the plurality of access points including at least a Node B and a Wireless Local Area Network (WLAN) router, a network agent coupled to each of the plurality of access points, and a mobile device in communication with one of the plurality of access points, wherein the radio network controller includes a database of network locations for the mobile device, the database including an Internet Protocol (IP) address of the mobile device, a unique identifier of the mobile device, and a network address of access point in communication with the mobile device, the network address being provided to the radio network controller from the network agent, and wherein the radio network controller comprises routing logic to update the database with the network address received from the network agent and route an incoming data packet to the mobile device based on the network address of the access point in communication with the mobile device. The system further includes a Serving GPRS Support Node (SGSN) in communication with the RNC, wherein the network location is transmitted to the RNC via the SGSN.

In yet another exemplary embodiment, the present invention is a method for routing a data packet to a mobile device on a network, including storing an Internet Protocol (IP) address and location information for a mobile device on the network, receiving a network location from a network agent in communication with the mobile device, the network agent being co-located with an access point providing a network access to the mobile device, updating the stored location information for the mobile device with the network location of the access point, receiving a request to transfer a data packet to the mobile device, and routing the data packet to the mobile device via the updated location information. The routing further comprises forwarding the network location of the access point to a source of the request to transfer the data packet.

DETAILED DESCRIPTION OF THE DRAWINGS

Figure 1:
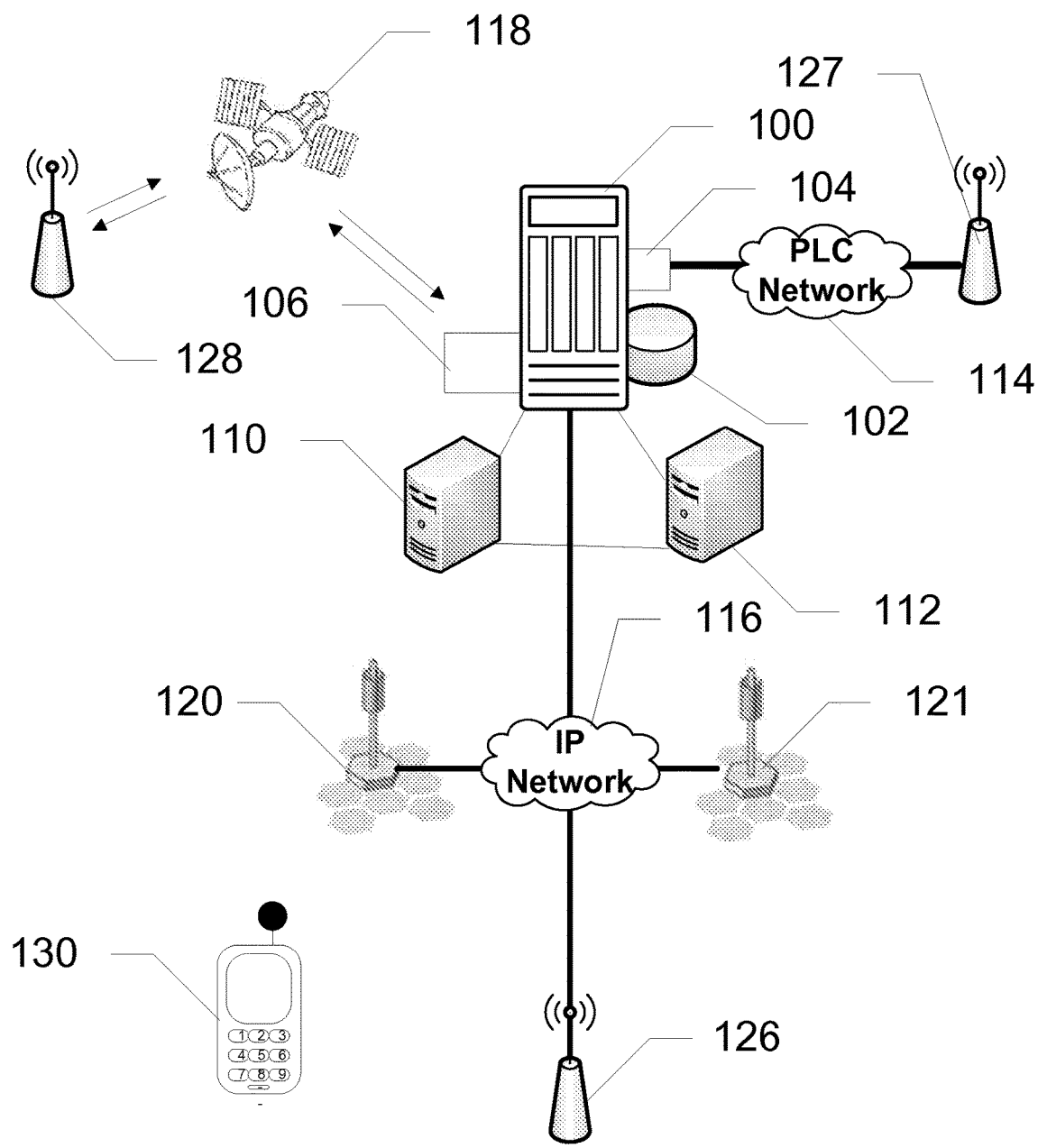
FIG. 1 shows a system for routing a data packet to a mobile device on a network, according to an exemplary embodiment of the present invention.

The present invention presents a novel technique for routing data packets in an IP mobility network. A radio network controller or base station controller includes a database or mapping table that tracks the network locations of mobile devices that are connected to various access points on one or more networks. The access points include base stations, Node Bs, wireless LAN, etc., and incorporate or are coupled to network agents. The network agent reports the location of the mobile device to the controller via a plurality of means such as over an IP network, a powerline network, or a satellite network. Using the database, or IP mapping table, having the most current locations of all the mobile devices under its domain or area, the controller can route data packets to the mobile devices using the most effective routing paths. In conjunction with providing handover services to the mobile device moving from one access point to another, the controller also creates routing paths by informing other network entities of the most current network location of the mobile device. The handover, as well as the routing of the data packet is transparent to a user of the mobile device.

As used herein and throughout this disclosure, the term As used herein and throughout this disclosure, the term "mobile device" refers to any electronic device capable of communicating across a mobile network. A mobile device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories). A transceiver includes but is not limited to cellular, GPRS, Bluetooth, and Wi-Fi transceivers.

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Mobile devices communicate with each other and with other elements via a network, for instance, a cellular network. A "network" can include broadband wide-area networks, local-area networks, and personal area networks. Communication across a network can be packet-based or use radio and frequency/amplitude modulations using appropriate analog-digital-analog converters and other elements. Examples of radio networks include UMTS, GSM, CDMA, WLAN and BLUETOOTH® networks, with communication being enabled by transceivers. A network typically includes a plurality of elements such as servers that host logic for performing tasks on the network. Servers may be placed at several logical points on the network. Servers may further be in communication with databases and can enable communication devices to access the contents of a database. For instance, Mobile Switching Center (MSC) maintains a database of Radio Access Networks (RAN), wherein each RAN is operated by a controller having a database of every radio access point (Node B or a WLAN hotspot). An example of a controller is a Radio Network Controller, which carries out radio resource management, some mobility management functions and is the point where encryption is performed before data is sent to and from the mobile device. An access point provides a radio interface whereby a mobile device having a transceiver can access a network such as a service provider's network or a private network. An access point can be a cellular base transceiver station (BTS), Node B, or it would be any other means for accessing a network such as a Wireless LAN hotspot, femtocell, and equivalents thereof. For the purposes of this disclosure, a Node B is equivalent to a BTS, and an RNC is equivalent to a BSC.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1 shows a system for routing a data packet to a mobile device on a network, according to an exemplary embodiment of the present invention. In this embodiment, a mobile roams between WLAN hotspots and a UMTS network without losing a connection with the UMTS network. A Radio Network Controller (RNC) 100 on the UMTS network provides this seamless handover. A mobile device 130 may access the UMTS network via both Node Bs 120-121 and WLAN hotspots 127-128, with RNC 100 of the UMTS network maintaining a mapping table to locate the user and provide appropriate handoff. In this embodiment, the system includes a mobile switching center (MSC) 110, a serving GPRS support node (SGSN) 112, RNC 100 with a database 102, a first Node B 120, a second Node B 121, a first WLAN hotspot 126, a second WLAN hotspot 127, a third WLAN hotspot 128, a satellite network 118, a powerline network 114, an IP network 116, and a mobile device 130.

MSC 110 is responsible for routing voice calls and SMS as well as other services (such as conference calls, FAX and circuit switched data). MSC 110 sets up and releases the end-to-end connection, handles some mobility features and handover requirements during the call, and takes care of charging and real time pre-paid account monitoring. SGSN 112 is responsible for the delivery of data packets from and to the mobile devices within its geographical service area, and provides a link between IP networks and RNC 100. Tasks performed by SGSN 112 include packet routing and transfer, mobility management (attach/detach and location management), logical link management, and authentication and charging functions. RNC 100 is a governing element in the UMTS radio access network (UTRAN) and is responsible for controlling Node Bs that are connected to RNC 100. RNC 100 carries out radio resource management, some of the mobility management functions, and is the point where encryption is done before user data is sent to and from the mobile device. RNC 100 connects to the Circuit Switched Core Network through a Media Gateway and to SGSN 112 in the packet switched core UMTS network. Node Bs 120-121 are hardware elements on a mobile phone network that connect mobile devices to a cellular network such as the UMTS network. According to exemplary embodiments, each Node B 120, 121 includes a cabinet, an antenna mast, an antenna, power amplifiers, a digital signal processor, and a power source in order to transmit and receive signals with mobile devices. Each Node B is generally controlled by RNC 100. With the emergence of High Speed Downlink Packet Access (HSDPA), some logic may be handled on Node Bs 120, 121 for lower response times.

Similar to the Node Bs, WLAN hotspots 126-128 each communicate with RNC 100 and their operation is governed in part by RNC 100. RNC 100 is therefore able to track the movement of mobile device 130 based upon the WLAN hotspot or Node B that is providing radio access to mobile device 130. This allows RNC 100 to ensure that data is sent to the correct WLAN hotspot or Node B where a user of mobile device 130 is located. A network agent coupled to or incorporated within each access point (i.e. Node B or WLAN) reports its network location along with an IP address of mobile device 130 to RNC 100. This allows the RNC to enable seamless handovers between hotspots and towers, etc. while sending and receiving data. Notably, RNC 100 generates and maintains a mapping table to track mobile device 130. The mapping table includes the IP address of mobile device 130, a unique identifier of mobile device 130, such as a MAC address or IMEI, and the network location or address received from the access point. Routing logic within RNC 100 uses an algorithm to determine a correct or most efficient route for sending data to the user. When the user enters a new zone, and connects to the network via a WLAN hotspot or Node B, the network agent coupled to the access point notifies RNC 100 of the presence and identity of mobile device 130. RNC 100 updates the mapping table with the new location of the user. RNC 100 can further forward the most current address of the user to any network entity that is seeking to transmit a data packet to the mobile device 130. Instead of manually forwarding every data packet to device 130, notifying the sender of the data packet enables a more efficient means for routing the data packet to the end user.

As shown in FIG. 1, the access points may connect to RNC 100 through various means in order to communicate a location of mobile device 130. As shown, first WLAN hotspot 126 is in communication with RNC 100 through an IP network connection. This is the same or equivalent type of connection that connects first Node B 120 and second Node B 120 to RNC 100 as well. When mobile device 130 enters an area served by first WLAN hotspot 126, first WLAN hotspot 126 notifies RNC 100 over IP network 116. Second WLAN hotspot 127 connects to RNC 100 over a powerline network or powerline communication (PLC)—a method of carrying data on a conductor, where the conductor is also used for electronic power transmission. PLC network 114 uses a modulated carrier signal on the wiring system provided by a standard power grid, thereby reducing the infrastructure costs of setting up a new network. Typically, a transformer prevents a signal from propagating, so multiple PLC technologies may be bridged together to form a larger network. Different types of PLC use different frequency bands, depending upon the signal transmission characteristics of the power wiring used. Notably, the contents of the data packet are transparent to the operator of the powerline network. The data packet can only be accessed by the network layer, if preferred, thereby being viewable only when it is delivered to the UMTS network or to the mobile device. When mobile device 130 enters an area served by second WLAN hotspot 127, second WLAN hotspot 127 notifies RNC 100 over PLC network 114.

Third WLAN hotspot 128 connects to RNC 100 over a satellite connection 118. RNC 100 may include a satellite transceiver 106 to communicate with third WLAN hotspot 128 using satellite 118, or satellite 118 communicates with other network elements such as SGSN 112 in order to transmit location information to RNC 100. Satellite 118 contains one or more transponders, each transponder being a separate transceiver or repeater. Generally, these transponders relay what is received, with an amplification of the signal. When mobile device 130 enters an area served by third WLAN hotspot 128, third WLAN hotspot 128 notifies RNC 100 of the IP address of mobile device 130 as well as a network location of third WLAN hotspot 128 via satellite 118. RNC 100 adds the received network locations from first WLAN hotspot 126, second WLAN hotspot 127, third WLAN hotspot 128, first Node B 120, and second Node B 121, as well as any other notifications received, to form a mapping table of addresses for mobile device 130. RNC 100 then routes any data packets addresses to mobile device 130 using the last known network address received from one of the plurality of access points. This routing can take many forms, for instance, by forwarding the latest network address to a network entity that is transmitting the data packet, by notifying MSC 110 about the new routing, or by actually forwarding the data packet itself.

Figure 2:
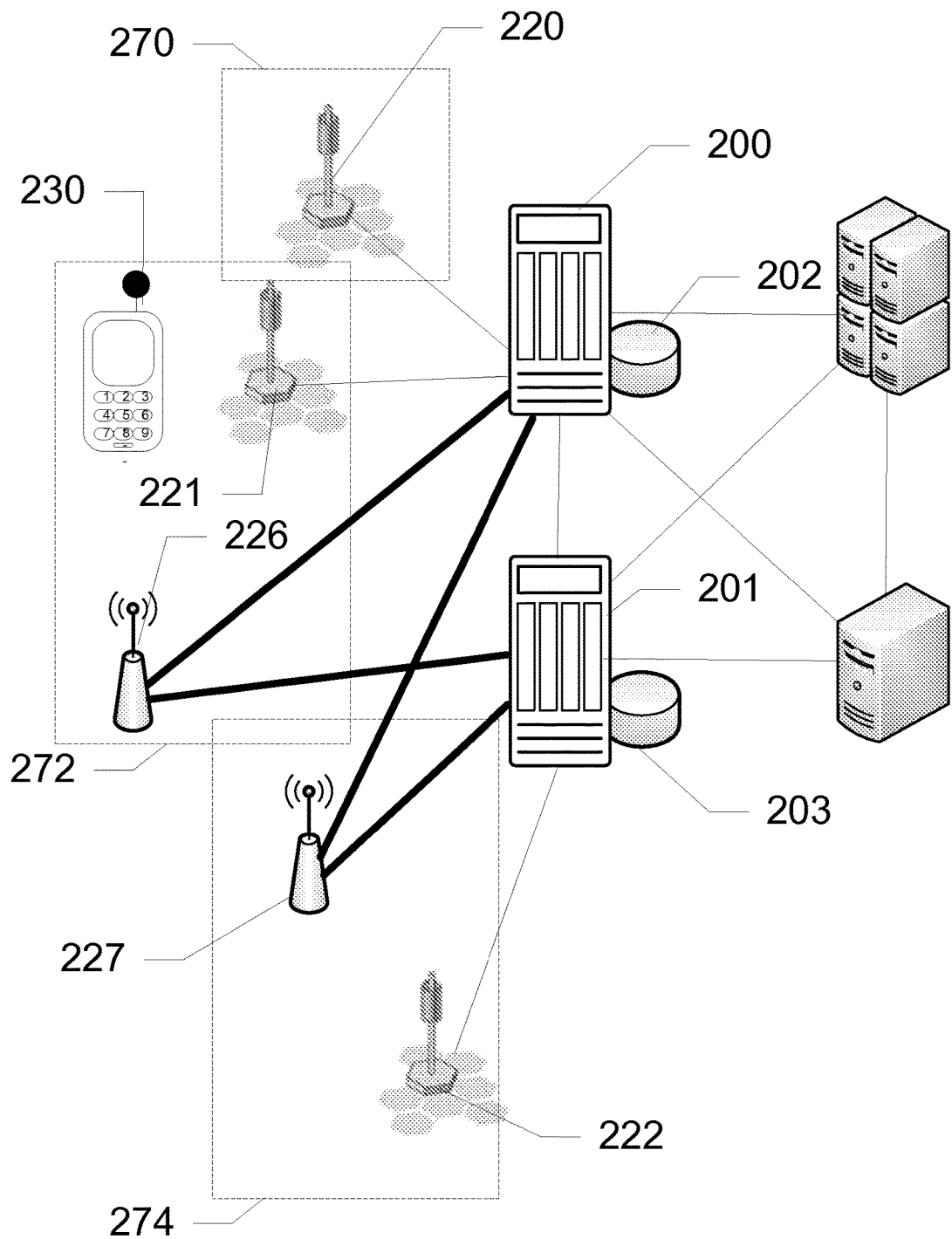
FIG. 2 shows a system for routing a data packet across a plurality of networks, according to an exemplary embodiment of the present invention.

FIG. 2 shows a system for routing a data packet across a plurality of networks, according to an exemplary embodiment of the present invention. In this system, a mobile device is able to roam between WLAN hotspots and a UMTS network utilizing multiple RNCs, in this case, first RNC 200 and second RNC 201. Mapping of the location of a mobile device may be done on one or both of first RNC 200 and second RNC 201. First RNC 200 and second RNC 201 are in communication with each other across the UMTS network, such that one or more mapping tables include all WLAN hotspots and Node Bs in the network. Thus, mobile device 230 can travel to any of the areas 270, 272, and 274 covered by a WLAN hotspot or Node B, and remain connected to the network.

For instance, mobile device 230 is first connected to first Node B 220, and communicates across the UMTS network via first Node B 220. A mapping table stored on database 202 on first RNC 200 records this location in a record associated with a unique identifier and IP address of mobile device 230. Mobile device 230 then moves into an area 272 covered by second Node B 226. Although both access points 220 and 221 cover a portion of the same area, a handover procedure initiated by either mobile device 230 or RNC 200 causes the communication path to switch from first Node B 220 to second Node B 221. In either case, second Node B 221 registers mobile device 230 and notifies first RNC 200 of the registration. First RNC stores the new location of mobile device 230 in a mapping table record associated with a unique identifier of mobile device 230, as well as any handoff performed. This enables data first RNC 200 to route any data packets destined to mobile device 230 to traverse access point 221.

A portion of area 272 is also offered radio access by WLAN hotspot 226. When mobile device connects to first WLAN hotspot 226, first WLAN hotspot 226 notifies either or both of first RNC 200 and second RNC 201. This notification may occur over an IP network connection, over a PLC network, over a satellite connection, etc. First RNC 200 and/or second RNC 201 updates the mapping table stored on either or both of databases 202 and 203 to include the network address of first WLAN hotspot 226 in a record associated with mobile device 230. Routing logic on either first or second RNCs creates routing paths for data packets to be sent to mobile device 230 via first WLAN hotspot 226. Mobile device 230 further sends data packets to network entities via first WLAN hotspot 226. Further, switching between hotspot 226 and Node B 221 is possible so long as mobile device 230 stays within area 272. Any handoffs between second Node B 221 and first WLAN hotspot 226 are handled seamlessly by logic on any combination of mobile device 230 and first RNC 200, such that they may occur, for instance, in the middle of an upload, download, phone call, etc.

Next, mobile device 230 moves into an area covered by second WLAN hotspot 227 and only partially covered by first WLAN hotspot 226, such that the signal of second WLAN 227 is much stronger than that of first WLAN 226. Although this new area 274 is also served by second Node B 222, logic on either mobile device 230 or RNC 201 determines that the most appropriate access point is second WLAN 227. This may be because a signal from second Node B 222 is very weak or non-existent, for instance, in an office building. Second WLAN hotspot 227 registers mobile device 230 and notifies one or both of first RNC 200 and second RNC 201 of this registering, along with a network address or location of second WLAN hotspot 227. As with first WLAN hotspot 220, this notification may occur over an IP network connection, over a PLC network, over a satellite connection, etc. First RNC 200 and/or second RNC 201 updates the location of mobile device 230 in its mapping table. As second WLAN hotspot 227 has a stronger signal than first WLAN hotspot 226, logic on any one of or a combination of first RNC, second RNC, and mobile device determines that mobile device is to be handed off to second WLAN hotspot 227. Data packets sent from mobile device 230 are sent to the network via second WLAN hotspot 227. Data packets destined for mobile device 230 are routed through second WLAN hotspot 227.

Mobile device 230 then moves into an area covered by third Node B 222. When third Node B 222 registers mobile device 230, third Node B 222 notifies second RNC 201 of the new registration along with a network location of third Node B 222. Any handoff between second WLAN hotspot 227 and third Node B 222 may be seamless. Second RNC 201 and/or first RNC 200 updates the mapping table to denote the new location of mobile device. Data packets destined for mobile device 230 are now routed through third Node B 222.

Figure 3:
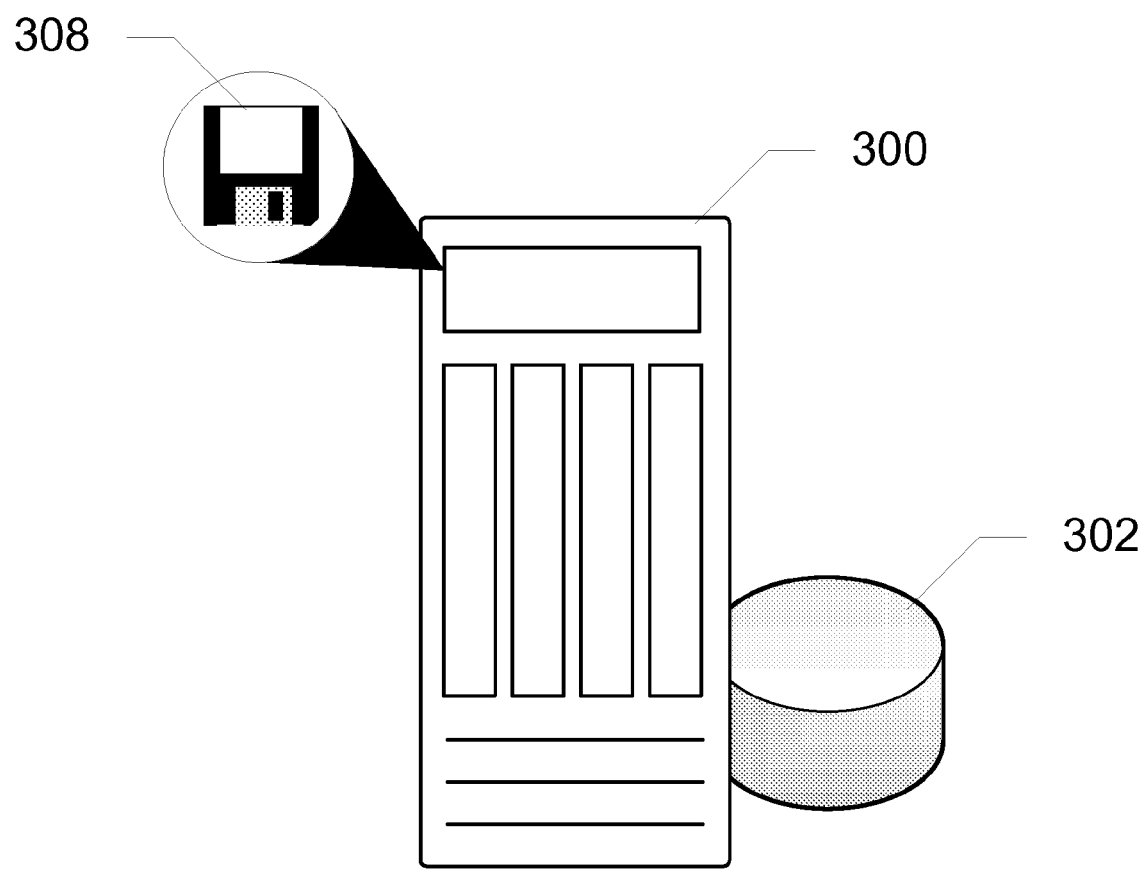
FIG. 3 shows the components of a controller, according to an exemplary embodiment of the present invention.

FIG. 3 shows the components of a controller, according to an exemplary embodiment of the present invention. In this embodiment, a controller 300, such as an RNC or BTC, includes a routing logic 308 stored on a local memory (not shown) as well as a database 302 in communication with RNC 300. Besides being a governing element in the UMTS radio access network and responsible for controlling Node Bs and other access points that are connected to RNC 300, the logic 308 enables RNC 300 to generate and maintain a mapping table to track mobile devices traversing the several access points. The mapping table is stored on database 302, and includes the IP address of the mobile devices, a unique identifier of the mobile devices, such as a MAC address or IMEI, and the network location or address received from the several access points. Logic 308 within RNC 300 uses an algorithm to determine a correct or most efficient route for sending data to the user. When the user's mobile device enters a new zone, and connects to the network via a WLAN hotspot or Node B, a network agent coupled to the access point notifies RNC 100 of the presence and identity of the mobile device. Logic 308 updates the mapping table stored on database 302 with the new location of the user, and then forwards the most current address of the user to any network entity that is seeking to transmit a data packet to the mobile device.

Figures 4A, 4B:
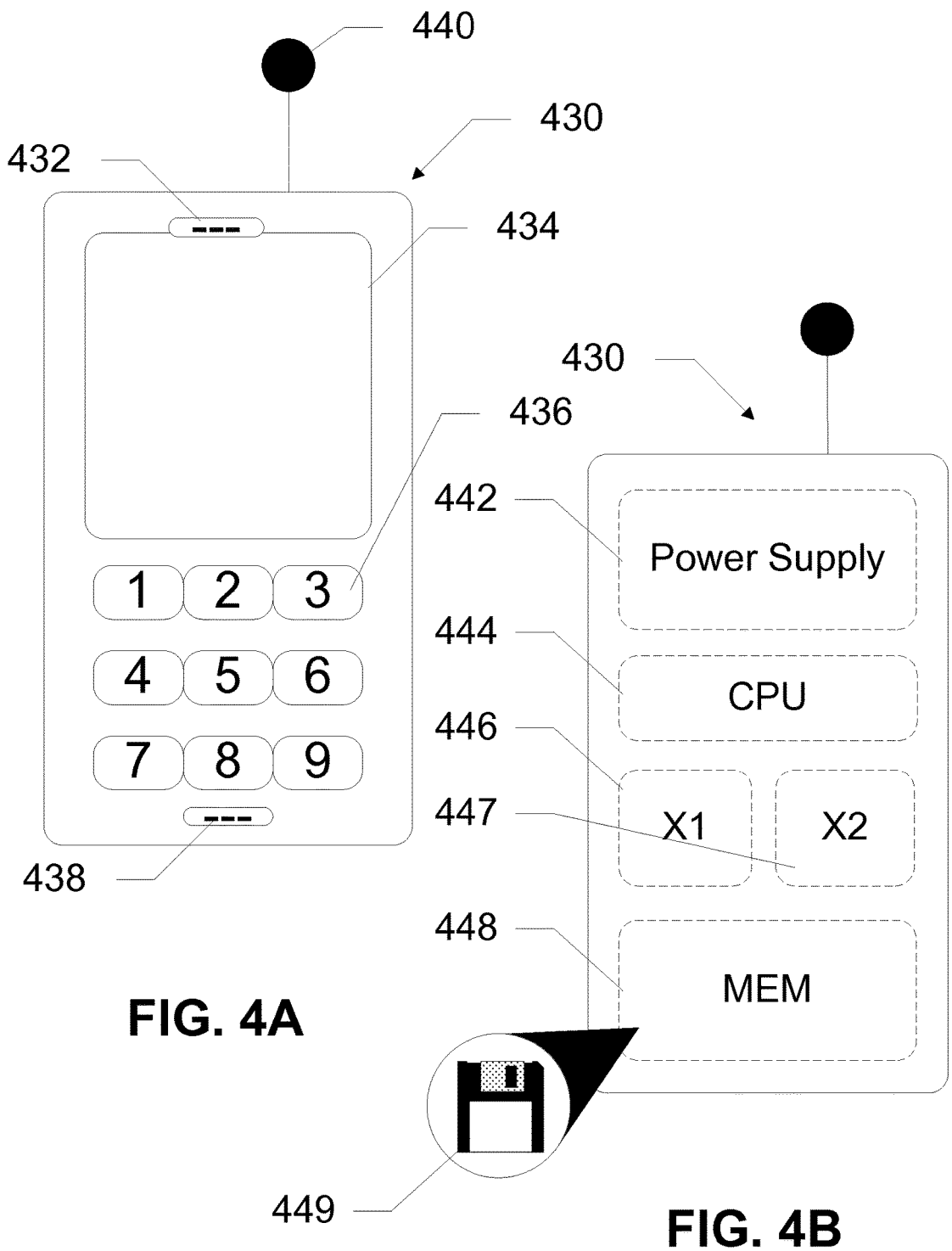
FIGS. 4A and 4B show a mobile device, according to an exemplary embodiment of the present invention.

FIGS. 4A and 4B respectively show the exterior and interior components of a mobile device 430, according to an exemplary embodiment of the present invention. According to this embodiment, mobile device 430 includes a speaker 432, a display 434, a keypad 436, a microphone 438, and an antenna 440. Mobile device 430 further includes a power supply 442, a central processing unit (CPU) 444, cellular transceiver 446, WLAN transceiver 447, and a memory 448. Memory 448 stores logic 449 for operating the components of mobile device 430.

Speaker 432 provides an output for mobile device 430. Display 434 is an LCD or LED or other type of display on which a user can view selections, numbers, letters, etc. Display 434 can also be a touchscreen, thereby being used as an input device. Keypad 436 is typically used as an input device, for instance, to type a phone number or a message. Keypad 436 may be a numerical keypad, a QWERTY keyboard, etc. The keypad may alternatively be implemented as touch sensitive areas on display 434. Microphone 438 allows the user to verbally communicate with others using mobile device 430. Antenna 440 is a transducer designed to transmit or receive electromagnetic waves to and from a network. In conjunction with antenna 440, transceivers 446 and 447 allow mobile device 430 to wirelessly communicate with a network, or with other wireless devices. In this embodiment, transceiver 446 communicates with a Node B or base station using cellular radio frequencies, for instance, UMTS or GSM. Transceiver 447 communicates with WLAN hotspots using Wi-Fi, WiMax, or equivalent radio frequencies. Power supply 442 provides power to each of the components of mobile device 430, and can include a battery, as well as an interface to an external power supply. CPU 444 controls components of mobile device 430 according to instructions in logic 449 stored on memory 448. Memory 448 comprises any computer readable medium, such as RAM, ROM, etc. Logic 449, at its minimum, enables operation of the components of mobile device 430 and to provide a user interface displayed on screen 434. Logic 219 can further include instructions to enable seamless handovers between different types of networks, for instance, by switching between transceivers 446 and 447. Other applications can be incorporated within logic 449.

Figure 5:
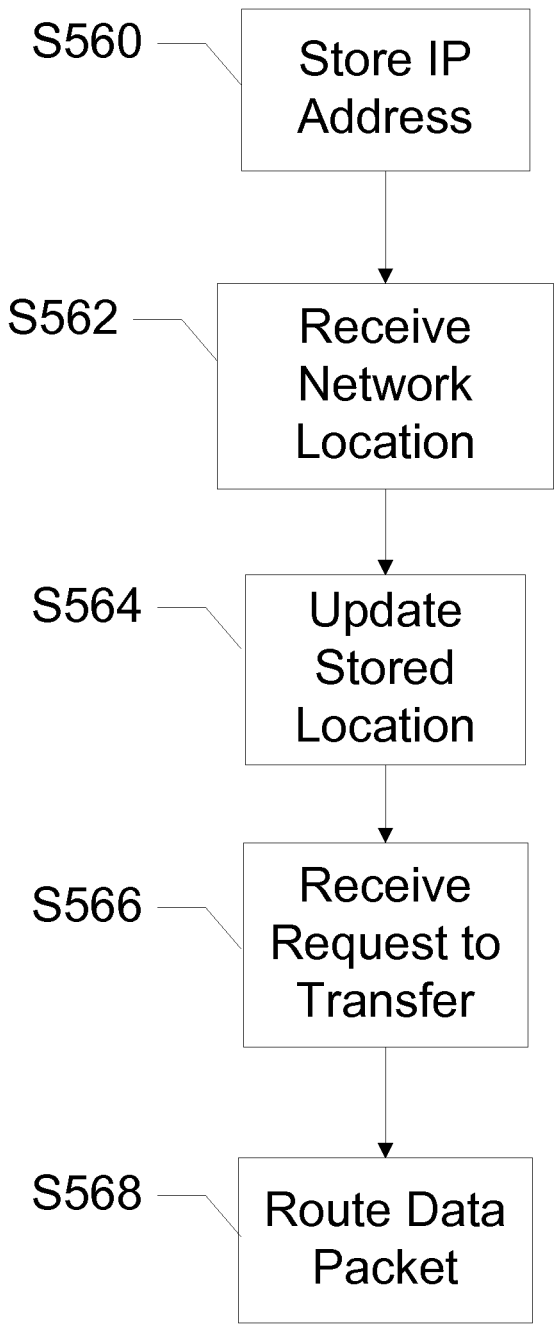
FIG. 5 shows a method for routing a data packet to a mobile device on a network, according to an exemplary embodiment of the present invention.

FIG. 5 shows a method for routing a data packet to a mobile device on a network, according to an exemplary embodiment of the present invention. According to this embodiment, the method begins with a RNC storing (S560) an Internet Protocol (IP) address, a network location or a default network location for the mobile device on the network, and a unique identifier for the mobile device such as a EIN, IMEI, IMSI, MAC address, and combinations thereof. The default network location can be assigned by a user of the mobile device or by the network operator, and can be dependent on the user's home location, office location, etc. The IP address and location information are included (S560) in a mapping table used to determine appropriate routing for data packets going to and from the mobile device. When the mobile device moves across locations, the RNC receives (S562) the network location from a network agent in communication with an access point that provides network access to the mobile device. The network agent is co-located or coupled to the access point. For instance, the network agent is part of a WLAN hotspot, a Node B, a BTS, etc. The RNC updates (S564) the mapping table for the mobile device with the network location of the network agent, such that the mapping table is current. With the mapping table updated, the RNC receives (S566) a request from another network entity to transfer a data packet to the mobile device. The other network entity can be another mobile device, or an intermediary, such as a MSC, or via a gateway to an external network. The RNC routes (S568) the requested data packet to the mobile device according to the updated location information. This can happen in a number of ways, for instance, the RNC may forward the updated location to the external network entity. Alternatively the RNC instructs an MSC to forward the data packet to the access point providing the network access to the mobile device. Other methods for routing the data packet will become evident to one of ordinary skill in the art in light of this disclosure.

Figure 6:
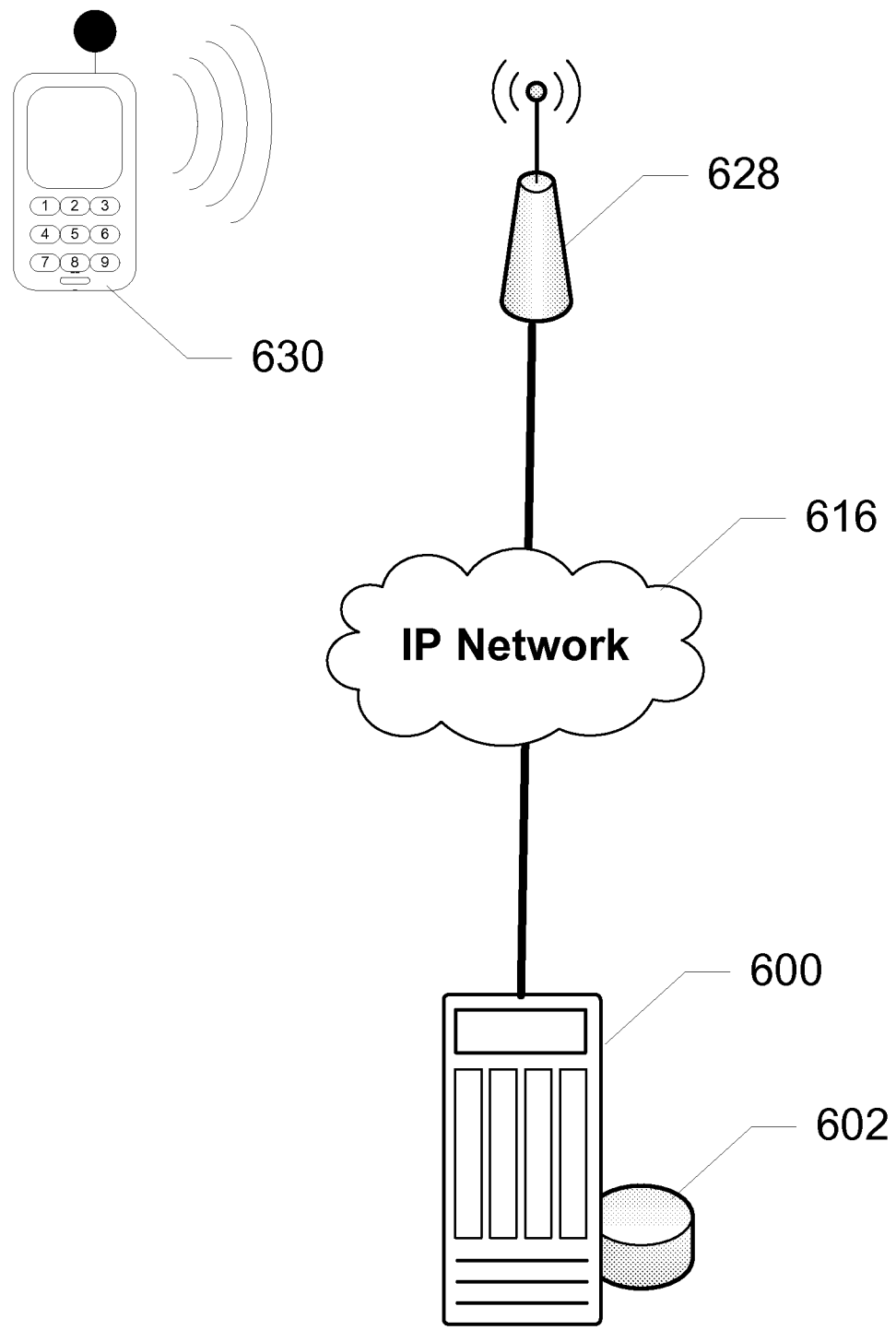
FIG. 6 shows an access point communicating with a controller across an IP network, according to an exemplary embodiment of the present invention.

FIG. 6 shows an access point communicating with a controller across an IP network, according to an exemplary embodiment of the present invention. In this embodiment, access point 628 is a WLAN hotspot that is in communication with the UMTS network via an IP network 616. With mobile device 630 in an area served by WLAN hotspot 628, WLAN hotspot 628 notifies RNC 600 over IP network 616 about the presence of mobile device 630. The notification includes a network address or location of WLAN hotspot 628. RNC 600 adds the received network location from WLAN hotspot 628 to a mapping table of addresses for mobile device 630 stored in database 602. RNC 600 then routes any data packets addressed to mobile device 630 using the updated network address/location.

Figure 7:
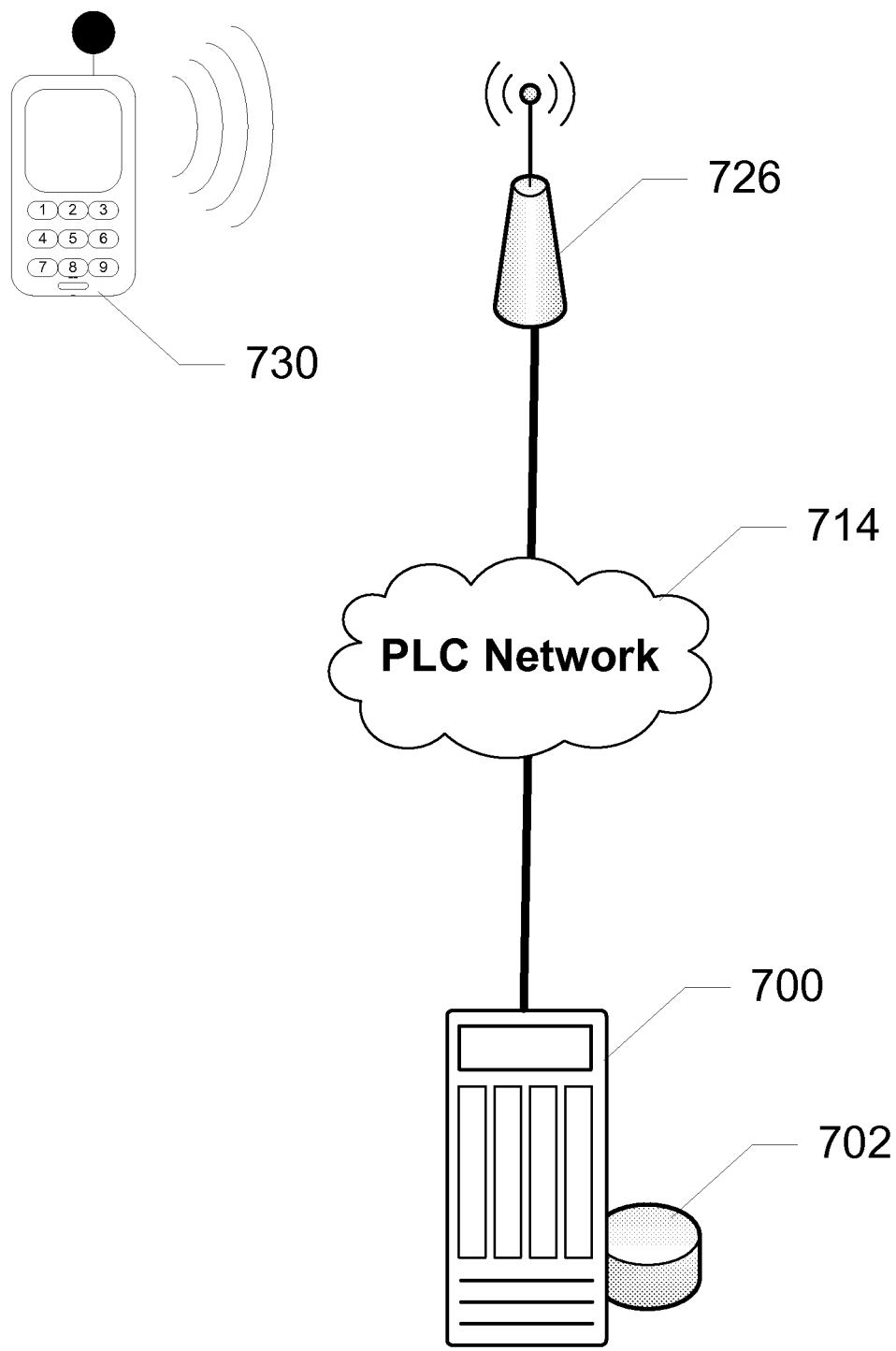
FIG. 7 shows an access point communicating with a controller across a powerline network, according to an exemplary embodiment of the present invention.

FIG. 7 shows an access point communicating with a controller across a powerline network, according to an exemplary embodiment of the present invention. WLAN hotspot 726 connects to RNC 700 over a powerline network 714. PLC network 714 carries data on a conductor also used for electronic power transmission. PLC network 714 uses a modulated carrier signal on the wiring system provided by a standard power grid. Multiple PLC technologies may be bridged together to form a larger network. When mobile device 730 enters an area served by WLAN hotspot 726, WLAN hotspot 726 notifies RNC 700 over PLC network 714 about the presence of mobile device 730. The notification includes a network address or location of WLAN hotspot 726. RNC 700 adds the received network location from WLAN hotspot 728 to a mapping table of addresses for mobile device 730 stored in database 702. RNC 700 then routes any data packets addressed to mobile device 730 using the updated network address/location. Data packets are then routed to mobile device 730 via hotspot 726, either via PLC network 714, or other available networks.

Figure 8:
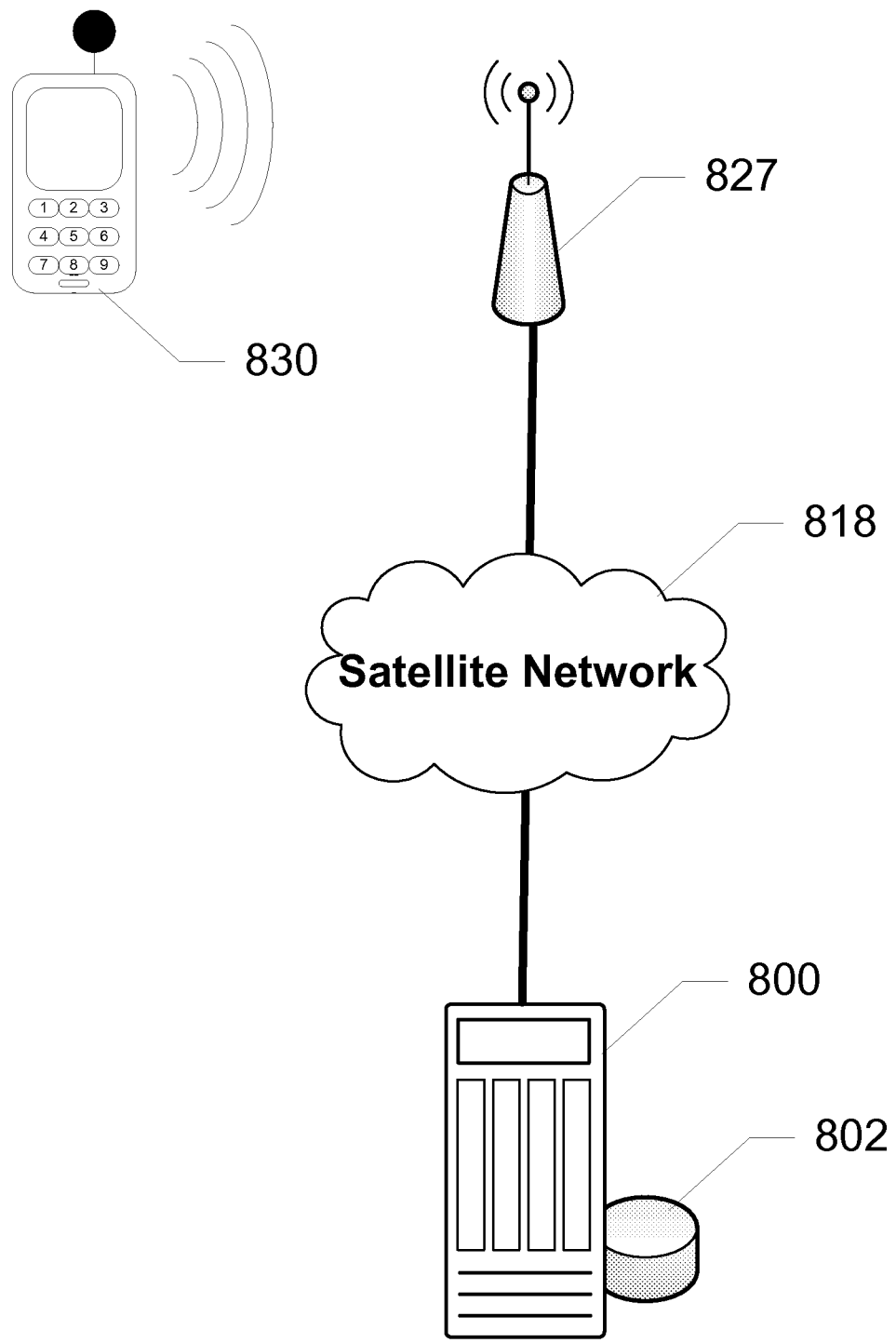
FIG. 8 shows an access point communicating with a controller across a satellite network, according to an exemplary embodiment of the present invention.

FIG. 8 shows an access point communicating with a controller across a satellite network, according to an exemplary embodiment of the present invention. WLAN hotspot 827 connects to RNC 800 over a satellite network 818. Satellite network uses a satellite containing one or more transponders, each transponder being a separate transceiver or repeater, to communicate signals between hotspot 827 and the core UMTS network. When mobile device 830 enters an area served by WLAN hotspot 827, WLAN hotspot 827 notifies RNC 800 over satellite network 818 about the presence of mobile device 830. The notification includes a network address or location of WLAN hotspot 826. RNC 800 adds the received network location from WLAN hotspot 827 to a mapping table of addresses for mobile device 830 stored in database 802. RNC 800 then routes any data packets addressed to mobile device 830 using the updated network address/location. Data packets are then routed to mobile device 830 via hotspot 826, either via satellite network 818, or other available networks.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. For instance, the data packet being routed can include voice, multimedia, or other information. The present invention can work in an IP Multimedia System (IMS) environment, using SIP addressing to maintain the mapping tables within the RNC. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A network element, comprising:
a processing system including a processor; and
a memory that stores executable instructions that, when executed by the processing system, facilitate performance of operations, comprising:
obtaining a network location from a mobile device;
updating a mapping table with the network location;
determining a routing of data packets to the mobile device based on the mapping table;
routing the data packets to the mobile device according to the network location; and
transmitting the network location to a source of the data packets.

2. The network element of claim 1, wherein the source is another mobile device different from the mobile device.

3. The network element of claim 1, wherein the operations further comprise obtaining a location of the mobile device from an agent in communication with an access point that provides network access to the mobile device.

4. The network element of claim 3, wherein the agent transmits the network location to the processor by way of an internet protocol network.

5. The network element of claim 3, wherein the operations further comprise:
determining a new network location of the mobile device; and
updating the mapping table with the new network location.

6. The network element of claim 3, wherein the agent transmits the network location to the processor by way of a satellite network.

7. The network element of claim 3, wherein the operations further comprise detecting that the mobile device has left the network.

8. The network element of claim 1, wherein the mapping table comprises a plurality of internet protocol addresses for a plurality of mobile devices including the mobile device.

9. The network element of claim 8, wherein the mapping table further comprises an identifier for each of the plurality of mobile devices.

10. The network element of claim 1, wherein the operations further comprise obtaining a request to transfer the data packets to the mobile device, wherein the routing of the data packets is responsive to the obtaining of the request.

11. The network element of claim 1, wherein the operations further comprise:
receiving a request from another network entity to transfer another data packet to the mobile device; and
routing the other data packet to the mobile device according to the mapping table.

12. A non-transitory, machine-readable storage medium, comprising executable instructions that, when executed by a processing system including a processor, facilitate performance of operations, comprising:
receiving a default network address from a mobile device;
updating a mapping table with the default network address, wherein the mapping table is used for determining a routing path for data packets to the mobile device;
routing the data packets to the mobile device according to the network address; and
transmitting the network address to a source of the data packets.

13. The non-transitory, machine-readable storage medium of claim 12, wherein the operations further comprise obtaining a new network address from an agent for accessing the mobile device in communication with a base station that provides network access to the mobile device.

14. The non-transitory, machine-readable storage medium of claim 13, wherein the agent is co-located with the base station.

15. The non-transitory, machine-readable storage medium of claim 13, wherein the agent transmits the network address via a packet transmission system.

16. The non-transitory, machine-readable storage medium of claim 13, wherein the agent transmits the new network address via a powerline network.

17. A method, the method comprising:
assigning, by a processing system comprising a processor, a network location to a mapping table according to a command from a communications device;
obtaining, by the processing system, a request to transfer a data packet to the communications device;
routing, by the processing system, the data packet to the communications device according to the mapping table; and
forwarding, by the processing system, the network location to a source of the data packet.

18. The method of claim 17, further comprising obtaining the network location from an agent in communication with the communications device, and
wherein the agent is co-located with an access point providing network access to the communications device.

19. The method of claim 17, wherein the method further comprises:
detecting that the communications device is in a location of another network; and
updating the mapping table based on the location of the other network.

* * * * *